(12) United States Patent
Servotte

(10) Patent No.: US 7,435,442 B2
(45) Date of Patent: Oct. 14, 2008

(54) NON-DAIRY PRODUCTS DERIVED FROM RICE AND METHOD OF MAKING

(75) Inventor: Yves Servotte, Meise (BE)

(73) Assignee: Nutriz N.V. (BE)

( * ) Notice: Subject to any disclaimer, the term of this patent is extended or adjusted under 35 U.S.C. 154(b) by 733 days.

(21) Appl. No.: 10/421,623

(22) Filed: Apr. 23, 2003

(65) Prior Publication Data

US 2004/0213890 A1 Oct. 28, 2004

(51) Int. Cl.
*A23L 1/10* (2006.01)
(52) U.S. Cl. ...................................................... 426/618
(58) Field of Classification Search ................ 426/564, 426/615, 618, 598
See application file for complete search history.

(56) References Cited

U.S. PATENT DOCUMENTS

| | | | | |
|---|---|---|---|---|
| 4,744,992 A | 5/1988 | Mitchell et al. | ................ | 426/29 |
| 5,292,537 A | 3/1994 | Hammond | .................... | 426/44 |
| 5,753,295 A | 5/1998 | Goldman | .................... | 426/590 |
| 5,876,778 A * | 3/1999 | Stewart | ....................... | 426/508 |

FOREIGN PATENT DOCUMENTS

| EP | 55054864 | 4/1980 |
|---|---|---|
| EP | 62029947 | 2/1987 |
| EP | 0 350 952 A2 | 1/1990 |
| EP | 0 970 614 A1 | 1/2000 |

OTHER PUBLICATIONS

J. Espinoza et al., "Rice-based formulas for rapid refeeding of infants with acute diarrhoea", Int. Journal of Food Sciences and Nutrition, vol. 43, No. 3, 1992, pp. 139-146.
Su Ting Shan, "Preparation of fermented rice milk beverage with aroma lactics" 6001 Chemical Abstracts, Columbus, Ohio US, vol. 103, No. 17, 1985.
(Abstract) Guerra, M.J. et al., "Formulation of a high-nutritional value beverage based on rice", Database FSTA accession No. 82-2-06-h0917, 1981.

* cited by examiner

*Primary Examiner*—Arthur L Corbin
(74) *Attorney, Agent, or Firm*—Hayes Soloway P.C.

(57) ABSTRACT

The invention consists of a mixture for a dairy alternative, in which the mixture is obtained by reconstituting ingredients separately extracted from rice and consists of at least two of the following ingredients, calculated in terms of the total weight of the mixture:
 a) 0 to 35% of the weight, rice flour or maltodextrine, preferably rice maltodextrine,
 b) 10 to 40% of the weight, fat or oil, preferably rice oil,
 c) 20 to 50% of the weight of glucose, preferably rice glucose syrup,
 d) 2 to 40% of the weight, water soluble rice proteins,
 e) 0 to 15% of the weight, rice starch.

The invention also concerns a dairy alternative, for example rice milk, rice cream, crème dessert, rice milk with fruit juice.

38 Claims, No Drawings

NON-DAIRY PRODUCTS DERIVED FROM RICE AND METHOD OF MAKING

Depending on their age and constitution, every human being has a regular need for a minimum quantity of "adapted" or healthy food. The necessary food or ingredients thereof can be found as such in nature or be prepared in the form of adapted food. A source of food found in nature almost never contains all suitable ingredients necessary for human constitution and maintenance. The great exception to this is "mother's milk". However, mother's milk is available only during a limited period. It is not always the ideal source of food, as mother's milk may sometimes have a fat content which is too high.

"Ordinary" milk, which is available in larger quantities, i.e. mainly cow's milk, but also sheep and goat's milk, is not suitable for every human being. Dietitians distinguish normally three main problems with ordinary cow's milk, as well as with sheep and goat's milk, namely:

a) the content and composition of the fats. The fat content is often too high and varies with seasons and with the composition of the supplied food. A regular control and adaptation of the fat content are therefore required. However, the adaptation of the fat content by partly or completely skimming influences the taste. Moreover, milk fat with fatty acids contains esterified cholesterol (as well as free cholesterol) and a high concentration of saturated and trans-unsaturated C12, C14 and C16 fatty acids (in contrast thereto, the unsaturated fatty acids of vegetable origin are mainly cis-double compounds). It is well known that mainly C12-C16 saturated fatty acids (or Low Density lipoProteins or LDP with a density of 1.019-1.063) and cholesterol are very harmful for people with heart and vascular diseases (arteriosclerosis).

b) the content and nature of the proteins. Proteins are biopolymers of amino acids. The molecular weight of proteins found in ordinary milk can vary from 15.000 to several millions. Proteins are the necessary N source for the human body. A lack or shortage of proteins can lead to serious diseases (e.g. "marasmus" in children). However, cow's milk also contains a number of proteins that are allergenic, i.e. which cause various allergies, depending on the person's sensitivity (known as milk protein allergies). The high molecular weight of some proteins also means that certain persons find it difficult to digest ordinary milk.

c) lactose, a disaccharide which is always present in milk, and the lactose intolerance related thereto (primary intolerance or hypolactation as well as secondary lactose intolerance). Lactose can be removed from the milk by a complicated procedure, thus denaturing the taste of the milk. The search for a solution to avoid the disadvantages of both mother's milk and ordinary milk, and to obtain an easy-to-prepare product which contains the necessary nutritional ingredients, is cheap and also simple to adapt (adapted to the specific needs of certain people), resulted in a.o. the preparation of "soya milk".

Soya milk as such has no attractive taste. Moreover, the composition of the proteins of soya milk are extremely different from both those in mother's milk and those in ordinary milk, while the composition of the fats also reveals striking differences. The great advantage of soya milk compared to mother's milk and ordinary milk is the absence of cholesterol and lactose. On the other hand, soya milk cannot be whipped up to a creamy consistency, and additional additives are needed when used as substitute for milk in products normally prepared with milk and/or products derived from milk (e.g. yoghurt).

A more recent solution consists of the use of rice as a source for the preparation of a liquid substitute for milk of animal origin, and for soya milk. Rice is a cheap source of food because available in large quantities as it is grown in many countries with different climates. Because of the differences in climate, soil and natural selection, there are nowadays hundreds of different varieties with usually pronounced differences in the content and composition of the fats and the proteins. When the husks are removed after the harvest, the rice is called "cargo" or brown rice. White rice is obtained by polishing the brown rice. During polishing many rice grains break. It is mainly broken rice that is processed to rice flour and other derivatives.

The known rice milk is obtained by milling polished rice, and preferably broken rice, to flour and hydrolysing the flour in water and dispersing it. The preparation of this rice milk is not very practical, if the milk has to be adapted for certain dietary purposes. After all, because of the possible differences in content and composition of the proteins and fats, depending on the variety of rice used, an analysis and the possible removal of certain components is necessary. Furthermore, irrespective of the concentration of the rice flour, this rice milk cannot be whipped up at all to produce a creamy product.

Surprisingly, it has been found that by extracting the components of rice separately first and then mixing a few, but preferably all separately extracted components, according to certain ratios, derivatives with unique properties are obtained, with which, for example, rice milk can be prepared having a nutritional value comparable to that of mother's milk, but without the components which are harmful for certain people and/or adapted to the dietary needs of certain people.

These derivatives make it also possible to prepare a liquid product that can be whipped up to a product with a creamy consistency and can serve as a substitute for cream made from ordinary milk. The whippability of the rice derivatives, e.g. rice milk, not only equals that of ordinary milk up to cream, but can even be enhanced by the choice of the ratios of the constituent components, and can therefore be used in a more universal way. If necessary, certain additives, such as sugars, cacao powder, etc., can be added to the derivatives or to the products such as rice milk or rice cream prepared with the derivatives, the subject matter of this invention.

Therefore, it is surprising that, although many good properties of rice have been known for a long time and rice was already used for the preparation of rice milk, it has been possible to obtain derivatives with unpredictable properties by, in accordance with the invention, extracting the components of the rice separately first, possibly further processing these components separately, and recombining certain components. These derivatives can be made available to the consumer, either in greatly concentrated form or in a directly consumable form, e.g. as rice milk.

The rice derivatives, object of the invention, thus consist of a mixture of certain components separately extracted from rice, namely, rice proteins soluble in water and natural rice starch, furthermore fat or oil, preferably rice oil extracted from rice bran ("rice bran oil") and glucose syrup, preferably rice glucose, possibly rice flour and water, and if desired, flavorings, such as sugars or aroma, can be added in minimal quantities. The amount of each component of the rice derivatives can and may vary within certain limits, depending on the dietary needs and/or the desired end product (e.g. rice milk, rice cream, rice yoghurt, substitute for milk in food normally prepared with ordinary milk).

Calculated in terms of the total weight, the derivatives, object of the invention, contain:

a) rice flour: approximately 0 to 35 weight %, preferably 8 to 30 weight %,
b) fat or oil: approximately 10 to 40 weight %, preferably 18 to 25 weight % rice oil,
c) glucose: approximately 20 to 50 weight %, preferably 30-40 weight % rice glucose,
d) soluble rice proteins: approximately 2 to 40 weight %, preferably 5 to 30 weight %,
e) natural rice starch: approximately 0 to 15 weight %, preferably 5 to 10 weight %.

If desired, the following can be added thereto:

f) an emulsifier: e.g. extracted from rice bran: 0,0 to 0,4 weight %, preferably 0,1 to 0,25 weight %, and/or
g) additives such as sugar and flavorings, if desired, up to 2 weight %.

The derivatives are preferably prepared by dry mixing the various components in quantities which depend on the desired end product, to produce a homogeneous mixture. In order to prepare rice milk, approximately 60 to 150 grams, preferably 90-120 grams, of the derivative are mixed in 1 liter of water. To prepare a mixture that can be whipped up, the weight ratio derivative/water can vary from 1/4 to 4/1.

The components of rice derivatives can be obtained by means of well-known procedures. Rice flour can be obtained, amongst others, by removing the husks of dried rice grains, preferably of broken rice grains (broken rice), removing the outer layers (the testa, the nucellus, the aleuron layer and the germ) from the brown rice obtained this way by polishing it ("abrasive milling"), and milling the polished rice (preferably when wet) to produce flour.

Rice starch. Starch means homopolymers, composed of alpha 1-4 and alpha 1-6 bonded anhydrous glucose units. Rice starch can be obtained by, for example, softening rice or broken rice in an alkaline (pH 7,5 to 11, preferably 8 to 9,5) aqueous solution (room temperature to 60° C.), so that practically all proteins present are dissolved. If desired, the proteins can be extracted from the softening water by centrifuging, after neutralisation of the softening water. The softened rice is then wet milled (e.g. in granules of 3 to 10 μm, preferably from 4 to 6 μm) and the starch granules and the fibres are separated from each other by, for example, sieving the suspension obtained with the wet milling. Then, the starch granules are extracted from the fibre-free suspension by, amongst others, neutralising the suspension, centrifuging the granules out of it, preferably washing them again, and thereafter drying them.

Glucose. Rice glucose is preferably used in the form of syrup obtained from rice starch. For this purpose, the rice starch is for example mixed with water and the starch is saccharified with amylase. After some time, the mixture is filtered, possibly demineralised, and concentrated by evaporation, preferably up to 50 to 80%. If the rice glucose is extracted from rice flour, then the flour is mixed with water, amylase is added, heated (up to e.g. 60° C.) to hydrate and open up the starch granules, followed by a second treatment with amylase (second saccharification), so that the partially hydrolysed starch granules desintegrate into fractions with a lower molecular weight. In both cases, the glucose syrups obtained have a dextrose equivalent (DE) which can be up to 45, depending on the duration of the saccharification and/or the choice of the amylase enzymes. The maltodextrines preferably used in the rice derivatives according to this invention have a DE of maximum 40, while the preference is for the ones with a DE between 20 and 35.

Rice oil. This oil is preferably extracted from rice bran, obtained when polishing rice. The most important components contained in rice bran, calculated in terms of the total weight of the bran obtained by polishing, are approximately, depending on the type of rice: fibres, 20 to 30 weight %, oils or fats, 15 to 25 weight %, easily digestible proteins 10 to 25 weight %, moisture and traces of vitamin B and of minerals 5 to 15 weight %. Depending on the type of rice, the oil contains approximately 17 to 24% of saturated fatty acids (mainly palmitine), 35 to 45% of mono-unsaturated fatty acids (oleine) and 30 to 42% polyunsaturated fatty acids (linoleine). Rice bran contains lipases, so that the oil can be hydrolysed to glycerol and free fatty acids. Therefore, it is desirable, especially if the oil is temporarily stored, to inactivate the lipases (e.g. by heating the bran when it is dry, or treating it with proteases) before obtaining the oil (e.g. by extracting or pressing) or for the cold pressing, heating the extracted oil to, for example, 60° C. during 10 to 20 minutes. The proteins, vitamin B and minerals present in the oil, can be removed therefrom (e.g., by centrifuging and washing). Because of the good properties of the proteins of rice bran and the importance of the vitamin B and minerals present in the rice bran for a healthy diet, these components can be added back to the rice derivatives or not be removed from the oil.

Oil can also be obtained from the germs produced by the polishing, e.g. by means of extraction. Because of the high content of lipases, it is desirable to inactivate the lipases, e.g. by heating to approximately 60° C. during 10 to 20 minutes.

The oil is usually refined by means of known techniques (removal of wax and gum, neutralisation of the free fatty acids followed by bleaching and de-odorising), in which, if desired, the unsaponifiable fraction is retained in the oil (because of the cholesterol reducing and other positive properties of the sterols, oryzanoles and tocopherols found therein).

Rice proteins. Preferably, the rice proteins are used which are released during the preparation of rice starch. The proteins are dissolved in the alkaline, neutral or acid solutions used for the preparation of rice starch. During the softening of the rice, technical additives, such as enzymes and surface tension reducing substances (surfactants), can be used. The proteins are obtained by neutralising (if necessary) or not the decanted solution (the proteins thus losing their solubility) and/or by concentrating it by means of centrifuge and/or traditional filtration and/or ultra filtration, possibly washing (during or after the filtration) and thereafter drying the concentrate obtained, preferably by means of "flash" drying or spray drying. The dried rice proteins are then transformed into water-soluble proteins by an enzymatic treatment with, for example, proteases, until the desired degree of solubility is achieved. This enzymatic treatment can also be carried out on the concentrate before drying.

The rice fibres present in the bran, which are largely insoluble, can also be extracted from the bran, e.g. by filtering, and, if desired, be added to the rice derivatives. For the preparation of an end product, such as rice milk, the derivative is prepared first. For this purpose, the separate components are thoroughly mixed together in a dried form in quantities and ratios depending on the desired properties of the end product. This dry mixture can now be packaged such as to be processed to rice milk later on. For the preparation of the end product, a suspension is formed from this dry mixture by stirring the mixture in the required amount of water to create the suspension. This suspension can be subjected to a UHT treatment to guarantee the microbial and physical stability before it is aseptically packaged in packaging material suitable therefor.

Some examples of alternatives to dairy products are given below. Proteins can be added in each of the examples.

EXAMPLES

1. Rice milk, neutral

|  | % | Fat | Protein | Carbohydrates | Moisture |
|---|---|---|---|---|---|
| Water | 90 | 0 | 0 | 0 | 100 |
| Cane sugar | 3 | 0 | 0 | 100 | 0 |
| Remylose 30-D-E | 3 | 0.5 | 1.3 | 92.16 | 4 |
| Rice oil | 2 | 99.95 | 0 | 0 | 0.05 |
| Remyflo 8150-ED (rice flour) | 0.5 | 0.85 | 6.8 | 72.25 | 15 |
| Remyline XS (natural rice starch) | 0.5 | 0.086 | 1.032 | 83.42 | 14 |
| Aroma | 0.4 | 0 | 0 | 0 | 95 |
| Emulsifier | 0.25 | 90 | 0 | 0 | 9 |
| Salt | 0.08 | 0 | 0 | 0 | 5 |
| Stabiliser | 0.06 | 0 | 0 | 0 | 0.5 |
|  | 100 | 2.2 | 0.1 | 6.5 | 90.9 |
|  |  |  |  | DS = | 9.1 |
|  |  |  |  | kcal = | 46.7 |
|  |  |  |  | kj = | 195.4 |
|  |  | Fats |  |  | 2.2 |
|  |  | of which: saturated |  |  | 0.4 |
|  |  | mono-unsaturated |  |  | 1 |
|  |  | poly-unsaturated |  |  | 0.8 |

2. Rice crème dessert (vanilla)

|  | % | Fat | Protein | Carbohydrates | Moisture |
|---|---|---|---|---|---|
| Water | 80.07 | 0 | 0 | 0 | 100 |
| Cane sugar | 9 | 0 | 0 | 100 | 0 |
| Rice oil | 3.5 | 99.95 | 0 | 0 | 0.05 |
| Remyflo R150-ED (rice flour) | 2.5 | 0.85 | 6.8 | 72.25 | 15 |
| Remyline XS (natural rice starch) | 4 | 0.086 | 1.032 | 83.42 | 14 |
| Aroma | 0.5 | 0 | 0 | 0 | 95 |
| Emulsifier | 0.25 | 90 | 0 | 0 | 9 |
| Salt | 0.1 | 0 | 0 | 0 | 5 |
| Stabiliser | 0.06 | 0 | 0 | 0 | 0.5 |
| Colouring agent | 0.03 | 0 | 0 | 0 | 0 |
|  | 100 | 3.7 | 0.2 | 14.1 | 81.5 |
|  |  |  |  | DS = | 18.5 |
|  |  |  |  | kcal = | 91.1 |
|  |  |  |  | kj = | 381.5 |
|  |  | Fats |  |  | 3.7 |
|  |  | of which: saturated |  |  | 0.6 |
|  |  | mono-unsaturated |  |  | 1.7 |
|  |  | poly-unsaturated |  |  | 1.3 |

3. Rice milk Peach/Apricot

|  | % | Fat | Protein | Carbohydrates | Moisture |
|---|---|---|---|---|---|
| Water | 87 | 0 | 0 | 0 | 100 |
| Cane sugar | 4.5 | 0 | 0 | 100 | 0 |
| Remylose 30-D-E (rice glucose) | 3 | 0.5 | 1.3 | 92.16 | 4 |
| Rice oil | 2 | 99.95 | 0 | 0 | 0.05 |
| Peach concentrate 65° | 0.7 | 0 | 0 | 60 | 95 |
| Remyline XS (native rice starch) | 0.8 | 0.086 | 1.032 | 83.42 | 14 |
| Calcium-glycerophosphate | 0.5 | 0 | 0 | 0 | 5 |
| Aroma | 0.4 | 0 | 0 | 0 | 95 |
| Alimentary acid | 0.2 | 0 | 0 | 0 | 95 |
| Emulsifier | 0.2 | 90 | 0 | 0 | 9 |
| Stabilisers | 0.1 | 0 | 0 | 99.5 | 0.5 |
| Salt | 0.1 | 0 | 0 | 0 | 5 |
| Colouring agents | 0.1 | 0 | 0 | 0 | 50 |
|  | 100 | 2.3 | 0.1 | 8.3 | 89.1 |
|  |  |  |  | DS = | 10.9 |
|  |  |  |  | kcal = | 54.0 |
|  |  |  |  | kj = | 226.2 |

-continued

3. Rice milk Peach/Apricot

| % | Fat | Protein | Carbohydrates | Moisture |
|---|-----|---------|---------------|----------|
| | Fats | | | 2.3 |
| | of which: saturated | | | 0.4 |
| | mono-unsaturated | | | 1.0 |
| | poly-unsaturated | | | 0.8 |

4. Rice cream

| | % | Fat | Protein | Carbohydrates | Moisture |
|---|---|-----|---------|---------------|----------|
| Water | 50 | 0 | 0 | 0 | 100 |
| Rice oil | 25 | 99.95 | 0 | 0 | 0.05 |
| Avebe MD-20 (rice maltodextrine) | 22.5 | 0 | 0 | 95 | 5 |
| Emulsifier | 2.5 | 72 | 0 | 0 | 15 |
| | 100 | 26.8 | 0.0 | 21.4 | 51.5 |
| | | | | DS = | 48.5 |
| | | | | kcal = | 326.6 |
| | | | | kj = | 1366.9 |
| | | Fats | | | 26.8 |
| | | of which: saturated | | | 4.3 |
| | | mono-unsaturated | | | 12.1 |
| | | poly-unsaturated | | | 9.5 |

5. Fermented products

Another rice derivative consists of the fermentation of the mixture dissolved in water and consisting of:

0 to 35 weight %, rice flour or maltodextrine, preferably rice maltodextrine, 0 to 40 weight %, fat or oil, preferably rice oil, 20 to 50 weight %, glucose, preferably rice glucose syrup, 2 to 40 weight %, rice proteins soluble in water, 0 to 15 weight %, rice starch by means of microbial cultures, such as, for example, Lactobacillus/Streptococcus strains.

Flavor test

A flavor test was carried out on 18 random persons who were not confronted beforehand with the products to be tasted. The test was carried out as follows:

A soya drink ("neutral milk" type) was compared via a triangle test. Of the three samples to be tested, two were the same and one was different. The one half of the test persons (9) was presented with two soya drinks and one rice drink, the other half (9) was presented with two rice drinks and one soya drink. The drinks were cooled beforehand to the same temperature, 4-6° C. The drinks were shaken just before being poured into a beaker, for having them assessed in the same way.

The drinks were poured into small completely transparent plastic beakers of 40 ml. The beakers were marked with a 3-figure code, in which one code always stands for rice, an other respectively for soya. All the rice drinks were poured into beakers with codes 546 and 295, all the soya drinks into beakers with codes 713 and 664. Therefore, 9 people received 546, 295 and 713, while the other 9 received 546, 713 and 664.

The test criteria were drawn up on the basis of physical and sensory observations. All the persons were presented with the following document.

| Triangle test for rice milk | | | | |
|---|---|---|---|---|
| | 546 | 713 | 295 | 6 64 |

Which samples are the same?
Describe the difference
- whiteness (most/least)
- transparency (most/least)
- thickness (viscosity; most/least)
- aftertaste (longest/least long)
- unpleasant taste (negative/least negative)
- homogeneity (more homogeneous/less)
- odour (pleasant/less)

preference

+ = most,
− = less,
? = no difference

The following responses were recorded for the 18 persons.

| | Rice | Soya | The same |
|---|------|------|----------|
| Whiteness (most) | 17 | 0 | 1 |
| Transparency (most) | 17 | 0 | 1 |
| Thickness (most viscous) | 10 | 8 | 0 |
| Aftertaste (longest) | 10 | 8 | 0 |
| Unpleasant taste (most negative) | 5 | 10 | 3 |
| Homogeneous (most) | 6 | 5 | 7 |
| Odour (most pleasant) | 7 | 7 | 4 |
| Preference | 11 | 6 | 1 |

The whiteness of the milk was perceived as very white for the rice (17 out of the 18), as well as the transparency (similar to semi-skimmed milk). The perception with regard to oral sensation (thickness, viscosity), like the aftertaste, was perceived to be about the same for both products. On the other hand, a negative funny taste was experienced for soya in 10 cases compared with 5 for rice. 3 test persons made no distinction. The odour of the samples is suppressed by the low but representative test temperature to a certain degree. In 11 cases there was a preference for rice, compared to 6 for soya, 1 person did not make a distinction.

Stability test

In emulsions of the oil-in-water type (milk, soya milk, rice milk, . . . ) a liquid oily phase is stabilised in the aqueous suspension by means of an emulsion system (lecithin, protein, other emulsifiers, . . . ). By means of homogenisation the fatty phase is hereby finely distributed, whereby the emulsifier physically "nestles" at the level of the water-fat interphase. Phenomena of destabilisation are related to the water insoluble property of oil/fat, the difference in density between water and oil, the difference in surface tension between large and small oil drops and gravity. All these phenomena together lead to the creaming the oily phase, which causes undesirable visual and taste-related effects. Moreover, certain other ingredients in the drinks can start to settle, with consequences not desired either.

By using ingredients separately (object of the patent), they can be introduced according to ideal ratios, depending on the application. Creaming phenomena occur in function of time (days, months, years), but are a direct result of gravity. Consequently, these phenomena can be simulated at an accelerated way by means of centrifuging tests. By calculating the applied force, it is possible by using simple tests to test in a few minutes that what could normally take months or years.

In the following test set-up, a conventional rice milk, a soya drink, a Nutriz neutral rice milk, and semi-skimmed cow's milk were subjected to a 1 month, 2 months, 4 months, 8 months and finally 12 months centrifuging test. The cream plug phase was expressed as a percentage of the total amount of fat (centrifuging test at very high speed which "breaks" the emulsion completely).

The table below shows the fraction of fat released in function of time, by correlating the corresponding centrifugation to a "number of days of sedimentation".

|  | Days (accelerated by centrifugation) | | | | |
| --- | --- | --- | --- | --- | --- |
|  | 30 | 60 | 120 | 240 | 360 |
| Rice milk | 56 | 78 | 89 | 91 | 93 |
| Soya milk | 21 | 36 | 42 | 53 | 65 |
| Nutriz | 11 | 17 | 21 | 24 | 35 |
| Cow's milk | 8 | 15 | 18 | 19 | 20 |

Whipped products were made from product combinations as described above, in accordance with the invention.

The rice protein has good whipping properties because of its good surfactant properties.

The rice protein makes it possible to incorporate air efficiently and in a stable way by means of normal mixing tests (mixer).

The volume increase throughout the whipping process is considerable (5-25×).

The stability of the whipped products obtained depends on the application.

Good stability was achieved for whipped rice cream (>1 day), mousses (>3 months), and ice cream (>6 months).

The invention claimed is:

1. A mixture for preparing a rice-derived dairy alternative, wherein the mixture is obtained by reconstituting ingredients that are individually extracted from rice, and further wherein the mixture contains rice oil, glucose syrup and water soluble rice proteins.

2. A mixture according to claim 1, wherein the mixture, in terms of total weight of the mixture, contains:
   10 to 40 weight percent rice oil;
   20 to 50 weight percent rice glucose syrup; and
   2 to 40 weight percent water soluble rice proteins.

3. A mixture according to claim 2, wherein the mixture further contains:
   0 to 35 weight percent rice flour or maltodextrine,
   20 to 50 weight percent glucose; and
   0 to 15 weight percent rice starch.

4. A mixture according to claim 1, containing, in terms of total weight of the mixture:
   8 to 30 weight percent rice flour or maltodextrine;
   18 to 25 weight percent rice oil;
   30 to 40 weight percent rice glucose syrup;
   5 to 30 weight percent water soluble rice proteins; and
   5 to 10 weight percent natural rice starch.

5. A mixture according to claim 1, additionally containing, calculated in terms of total weight of the mixture, up to 4 weight percent emulsifier.

6. The mixture according to claim 5, wherein the emulsifier is extracted from rice bran.

7. A mixture according to claim 1, additionally containing, calculated in terms of total weight of the mixture, up to 15 weight percent flavorings and sweeteners.

8. A mixture according to claim 1, additionally containing water in a weight ratio of the mixture to water ranging from 60/1000 to 150/1000.

9. A mixture according to claim 1, additionally containing water in a weight ratio of the mixture to water ranging from 1:4 to 4:1.

10. A dairy alternative in the form of a rice milk, comprising a mixture according to claim 1, wherein the dairy alternative is comprised of in terms of total weight of the dairy alternative;
    0 to 5 weight percent rice flour;
    1 to 3 weight percent rice oil;
    2 to 5 weight percent rice glucose syrup;
    0.5 to 4 weight percent water soluble rice proteins;
    up to 0.4 weight percent emulsifier;
    0 to 2 weight percent rice starch; and
    83 to 94.5 weight percent water.

11. A dairy alternative comprising a mixture according to claim 10, wherein the dairy alternative is gravimetrically stable.

12. A process for manufacturing a dairy alternative according to claim 11 wherein the ingredients of the dairy alternative are dry mixed to obtain a mixture, and further wherein the obtained mixture is mixed with water.

13. A dairy alternative comprising a mixture according to claim 10, wherein the dairy alternative is obtained by dry mixing the ingredients, and further wherein at least 95 percent of the total ingredients is of vegetable origin.

14. A process for manufacturing a dairy alternative according to claim 13 wherein the ingredients of the dairy alternative are dry mixed to obtain a mixture, and further wherein the obtained mixture is mixed with water.

15. A process for manufacturing a dairy alternative according to claim 10, wherein the ingredients of the dairy alternative are dry mixed to obtain a mixture, and further wherein the obtained mixture is mixed with water.

16. The dairy alternative according to claim 10, wherein the emulsifier is extracted from rice bran.

17. A dairy alternative in the form of a crème dessert, comprising a mixture according to claim 1, wherein the dairy alternative is comprised of, in terms of total weight of the dairy alternative:
   0.1 to 5 weight percent rice flour;
   1 to 5 weight percent rice oil;
   up to 5 weight percent rice glucose syrup;
   up to 4 weight percent water soluble rice proteins;
   up to 0.4 weight percent emulsifier;
   0.1 to 5 weight percent rice starch; and
   75 to 94.5 weight percent water.

18. The dairy alternative according to claim 17, wherein the emulsifier is extracted from rice bran.

19. A dairy alternative comprising a mixture according to claim 17, wherein the dairy alternative is gravimetrically stable.

20. A dairy alternative comprising a mixture according to claim 17, wherein the dairy alternative is obtained by dry mixing the ingredients, and further wherein at least 95 percent of the mixture is of vegetable origin.

21. A process for manufacturing a dairy alternative according to claim 17, wherein the ingredients of the dairy alternative are dry mixed to obtain a mixture, and further wherein the obtained mixture is mixed with water.

22. A mixture according to claim 1, wherein the mixture is a whipped product that contains water, and further wherein the whipped product is gravimetrically stable.

23. A process for manufacturing a dairy alternative according to claim 22, wherein the dairy alternative is prepared using a suspension that is created by stirring or by dry mixing and then adding water.

24. The process of claim 23, wherein the suspension is further subjected to UHT treatment and/or fermentation by a microbial culture.

25. A mixture according to claim 1, wherein the mixture is a liquid product that contains water, and further wherein the product can be whipped to yield a product with a creamy consistency.

26. A process for manufacturing a mixture according to claim 25, wherein the mixture is prepared using a suspension that is created by stirring or by dry mixing and then adding at water.

27. A rice-derived dairy alternative comprising a fermented mixture according to claim 1, dissolved in water.

28. A process for manufacturing a dairy alternative according to claim 27, wherein the dairy alternative is prepared using a suspension that is created by stirring or by dry mixing and then adding water.

29. A mixture according to claim 1, wherein the mixture is obtained by dry mixing the rice-derived ingredients.

30. The mixture according to claim 29, wherein the mixture contains:
   0 to 35 weight percent rice flour or maltodextrine;
   10 to 40 weight percent rice or oil;
   20 to 50 weight percent glucose; and
   0 to 15 weight percent rice starch.

31. The mixture according to claim 29, additionally containing, in terms of total weight of the mixture, up to 4 weight percent emulsifier.

32. The mixture according to claim 31, wherein the emulsifier is extracted from rice bran.

33. The mixture according to claim 29, additionally containing, in terms of total weight of the mixture, up to 15 weight percent flavorings and sweeteners.

34. A process for manufacturing a mixture according to claim 1, which comprises dry mixing the rice-derived ingredients.

35. The process according to claim 34, wherein there is also mixed:
   0 to 35 weight percent rice flour or maltodextrine;
   10 to 40 weight percent rice oil;
   20 to 50 weight percent glucose; and
   0 to 15 weight percent rice starch.

36. The process according to claim 34, wherein there is also mixed, in terms of total weight of the mixture, up to 4 weight percent emulsifier.

37. The process according to claim 36, wherein the emulsifier is extracted from the rice bran.

38. The process according to claim 34, where there is also mixed, in terms of total weigh of the mixture, up to 15 weight percent flavorings and sweeteners.

* * * * *